United States Patent
Kreutzig

[19]

[11] Patent Number: 6,158,865
[45] Date of Patent: Dec. 12, 2000

[54] COLOR ENHANCING FILTER AND METHOD OF EMPLOYING A COLOR ENHANCING FILTER TO IMPROVE HUMAN EYE VISION

[76] Inventor: Kirk Kreutzig, 7 S 349 Marionway, Naperville, Ill. 60540

[21] Appl. No.: 09/429,979

[22] Filed: Oct. 29, 1999

[51] Int. Cl.[7] .................................................. A61B 3/00
[52] U.S. Cl. .................................................. 351/213
[58] Field of Search .................................. 351/213, 233, 351/162, 885

[56] References Cited

U.S. PATENT DOCUMENTS

| | | |
|---|---|---|
| 3,294,556 | 12/1966 | Harrington . |
| 3,571,649 | 3/1971 | Bush, Jr. . |
| 3,588,215 | 6/1971 | Singh . |
| 3,619,624 | 11/1971 | Sorenson . |
| 3,929,487 | 12/1975 | Singh . |
| 4,542,959 | 9/1985 | Kreutzig . |
| 5,719,715 | 2/1998 | Westhaver .............................. 359/885 |

OTHER PUBLICATIONS

Hurst, *Colour, A Handbook of the Theory of Colour*, pp. 34–35, 49 (1900).
Kuleshov, et al, *Thin–film absorption light filters*, Sov. J. Opt. Technol., 46(1), p. 51 (1979).
Rolands, *The Underwater Photographer's Handbook*, pp. 74–75 (1983).

*Primary Examiner*—George Manuel
*Attorney, Agent, or Firm*—Holland & Knight LLP

[57] ABSTRACT

A color enhancing filter is disclosed which is especially adapted for use to improve eye vision under all lighting environments. Lighting environments include extreme lighting environments, such as, low level and brightly illuminated light environments. The filter is supported by an adapter ring. It also has a filter element which passes impinging light wavelengths as follows:

| Light Wavelength (nm) | % Incident Light Transmitted |
|---|---|
| 400 | 25 |
| 450 | 12 |
| 470 | 08 |
| 500 | 04 |
| 520 | 07 |
| 570 | 50 |
| 600 | 87 |
| 700 | 90 |

A method of improving human eye vision utilizing the filter is also disclosed. The method includes causing various types of light to travel to a subject and to be reflected or transmitted from the subject to a light-amplification device or the human eye.

10 Claims, 2 Drawing Sheets

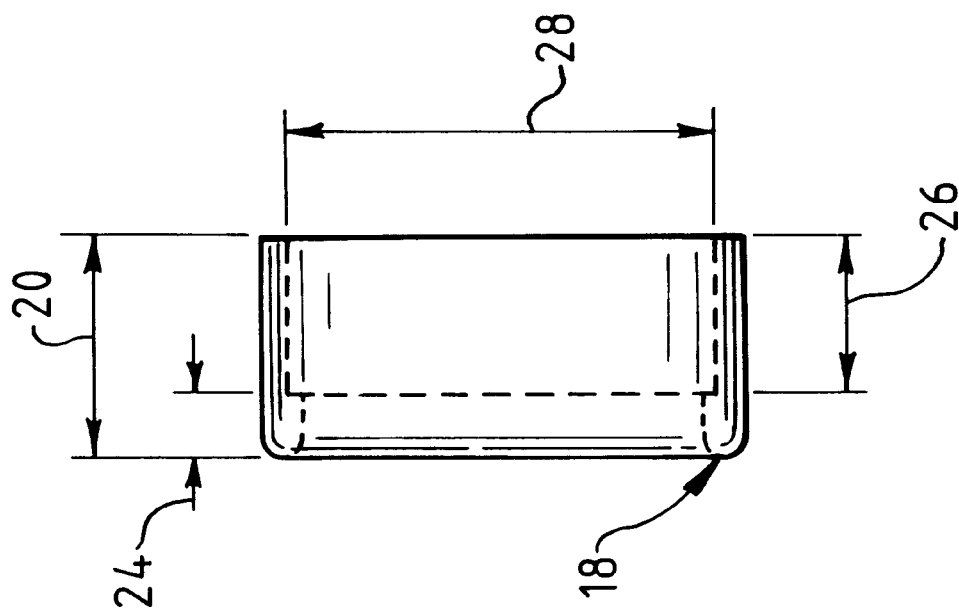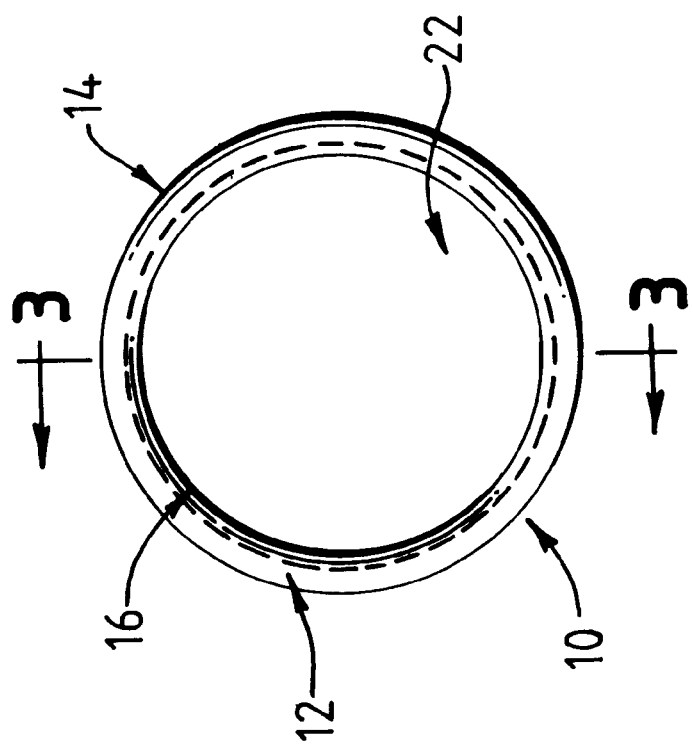

COLOR ENHANCING FILTER AND METHOD OF EMPLOYING A COLOR ENHANCING FILTER TO IMPROVE HUMAN EYE VISION

BACKGROUND OF THE INVENTION

This invention relates to optical filters, and more particularly concerns a color enhancing filter which will improve human eye vision under all lighting environments including extreme lighting environments.

Extreme lighting environments generally involve either very low or very high levels of light. In either environment, it is difficult for the human eye to accurately visualize objects. For example, this difficulty presents a particular challenge for law enforcement agencies, the military and everyday citizens who must perform activities, such as travel or navigation, under low level lighting conditions.

To overcome the absence of vision under low level environments, the military and private industry have developed active vision enhancing devices. However, these devices require the use of an electronic mechanism to amplify very low levels of light. The amplified light is then converted into images on a cathode tube or other device for viewing by the human eye.

To enhance vision under bright light environments, traditional smoke gray eye glass lenses have been generally used. However, the smoke gray lenses act to reduce the total amount of light that reaches the eye, thereby interfering with vision focus and accuracy. Moreover, the darkening effects of the smoke gray lenses may cause the eye to dilate. Unless ultraviolet protection is additionally provided, the smoke gray lenses, alone, permit additional and harmful ultraviolet radiation emitted from a light source to reach the eyes.

It is the general object of the present invention to improve human eye vision under all lighting environments including extreme lighting environments.

It is another object of this invention to improve human eye vision by employing a color enhancing filter under low level light environments with or without the aid of light amplification devices.

It is yet another object of this invention to improve human eye vision by employing a color enhancing filter under brightly illuminated environments.

It is a further object to provide a color enhancing filter which will not deteriorate or change optical properties even long after its manufacture, or after extensive use.

Other objects and advantages of the invention will become apparent upon reading the following detailed description and upon reference to the drawings. Throughout the drawings, like reference numerals refer to like parts.

SUMMARY OF INVENTION

An optical filter is disclosed, which is adapted for use under all lighting environments, and more particularly, extreme lighting environments, such as, low level lighting and brightly illuminated environments. The filter has a filter element that passes impinging light wavelengths.

A method of improving human eye vision employing a color enhancing filter that is attached to an eye viewing apparatus is also disclosed. The method includes causing various types of light to travel to a subject and to be reflected or transmitted from the subject to a light-amplification device or the human eye.

BRIEF DESCRIPTION OF DRAWINGS

FIG. 2 is a perspective view of the novel filter.

FIG. 3 is a side sectional view of the novel filter in the plane of line 3—3 taken in FIG. 2.

DETAILED DESCRIPTION OF THE PRESENTLY PREFERRED EMBODIMENT

Figure 1:
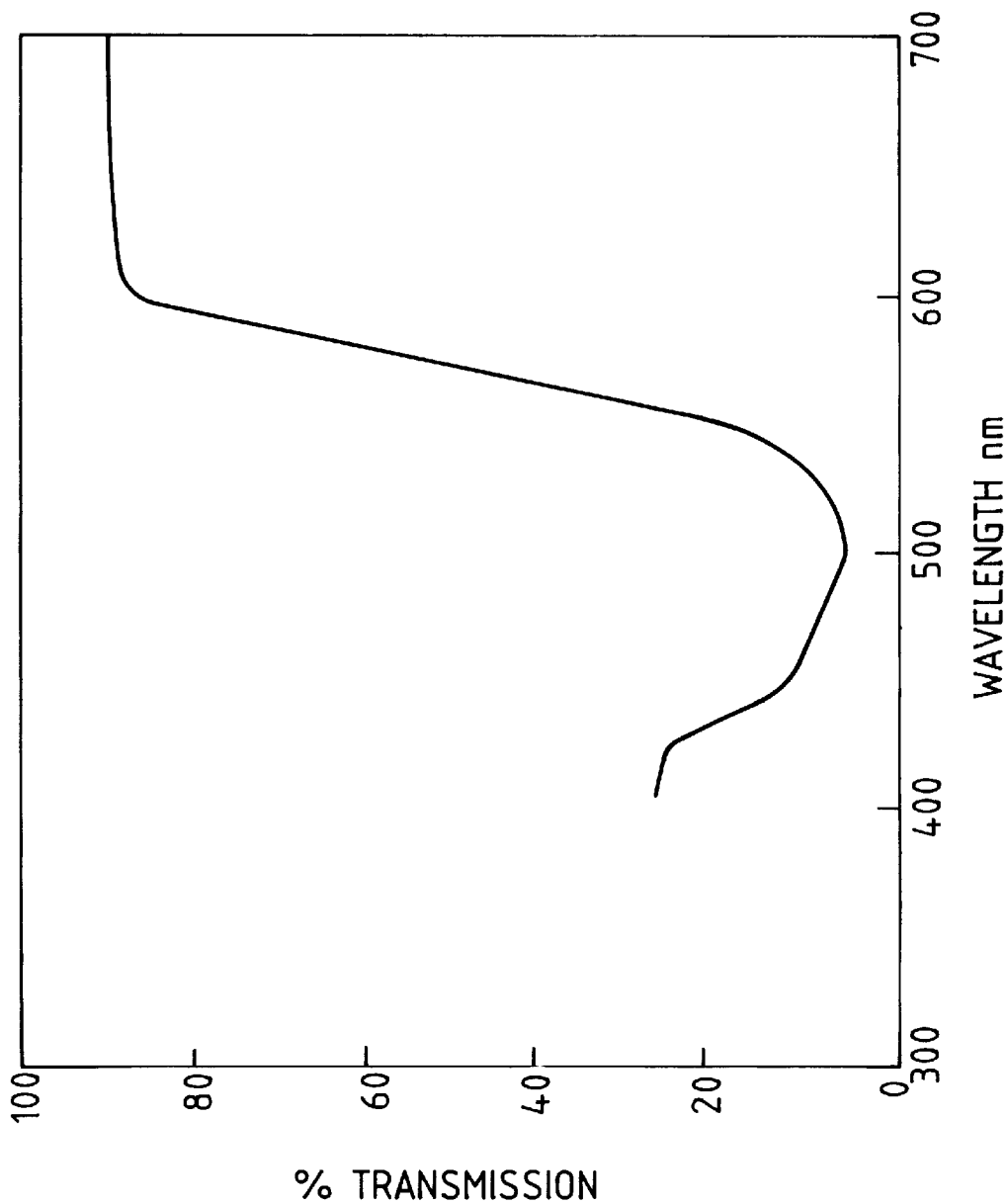
FIG. 1 is a graph showing the transmission of specific wavelengths of light (or spectral transmission response curve) of the novel color enhancing filter made in accordance with the invention.

While the invention will be described in connection with a preferred embodiment and procedure, it will be understood that it is not intended to limit the invention to this embodiment or procedure. On the contrary, it is intended to cover all alternatives, modifications and equivalents as may be included within the spirit and scope of the invention as defined by the appended claims.

A preliminary understanding of a color enhancing filter will be helpful in understanding the invention. The color enhancing filter is represented by a sophisticated optical spectral curve, which selectively attenuates specific wavelengths of light to optimize vision, color, safety and performance. One such color enhancing filter is described in Kreutzig U.S. Pat. No. 4,542,959.

Regardless of its application, the filter provides the user with the ability to optimize vision under all lighting environments including extreme lighting conditions that result from weather conditions such as, rain, fog, snow, haze, sun glare or other weather conditions that correspondingly create extreme lighting environments. By use of the filter, eye comfort, scene contrast, visual clarity and scene brightness are significantly improved.

Not only does the filter enhance the user's ability to optimize vision, the filter also provides the user with a safe means to optimize vision. Under laboratory tests, the filter has met and/or exceeded ANSI, International Industrial Safety, Military and other vision industrial standards. In addition, the filter protects against dangerous effects of ultraviolet light. The filter eye protection superiority is clearly demonstrated by documented scientific laboratory photospectral analysis of the filtered light transmission characteristics:

| | |
|---|---|
| VISIBLE LIGHT | 57.6% |
| NEAR ULTRAVIOLET LIGHT | 0.00042% |
| FAR ULTRAVIOLET LIGHT | 0.00006% |
| NEAR INFRARED LIGHT (IR) | 74.3% |
| BLUE LIGHT | 19.0% |

It is generally thought that ultraviolet light may be harmful to the human body, forming skin cancers. Moreover, the human eye is especially sensitive to damage caused by unseen and unfelt ultraviolet radiation that does not become apparent until months or years later, after much damage has occurred.

The filter with its beneficial result of safely optimizing vision under all lighting condition, including extreme lighting conditions, displays a wide array of recreational and commercial applications. Recreational and commercial applications include, for example, boating, flying, skiing, surveillance activities, underwater activities and other activities undertaken in extreme lighting conditions.

Furthermore, the filter has performed very well during experimental testing. For example, law enforcement agencies report that the filter significantly improved vision within a smoke-filled environment. In addition, commercial and private pilots reported dramatic haze penetration during mid and high altitude flights. They also reported that the ground and terrain color was significantly improved revealing previously unseen details. The filter was also used by an internationally ranked yacht skipper who asserted that properties within the lens color allowed him to see minute subtleties in the sea and wind along with sail detail that was totally absent when compared to "ordinary glasses."

In accordance with a suggested exemplary embodiment of the invention, a color enhancing filter having the spectral transmission curve shown in FIG. 1 has been found to improve eye vision under all lighting conditions, including extreme lighting conditions. Important data points on this curve are:

| Light Wavelength (nm) | % Incident Light Transmitted |
|---|---|
| 400 | 25 |
| 450 | 12 |
| 470 | 08 |
| 500 | 04 |
| 520 | 07 |
| 570 | 50 |
| 600 | 87 |
| 700 | 90 |

However the present invention is not limited by the specific curve of the exemplary embodiment of this invention. The light wavelength data points of the exemplary embodiment may vary with respect to each of the % Incident Light Transmitted data points of the exemplary embodiment of this invention. Based on this variation, the spectral curve can be represented as follows:

| Light Wavelength (nm) | % Incident Light Transmitted |
|---|---|
| ranges from about 396 to about 404 | 25 |
| ranges from about 445 to about 455 | 12 |
| ranges from about 465 to about 475 | 08 |
| ranges from about 495 to about 505 | 04 |
| ranges from about 515 to about 525 | 07 |
| ranges from about 564 to about 576 | 50 |
| ranges from about 594 to about 606 | 87 |
| ranges from about 693 to about 707 | 90 |

Another variation of the exemplary embodiment of the spectral curve can be represented as follows:

| Light Wavelength (nm) | % Incident Light Transmitted |
|---|---|
| 400 | 25 |
| 450 | 12 |
| 470 | 08 |
| 500 | 04 |
| 520 | 07 |
| ranges from about 567 to about 573 | 50 |
| ranges from about 597 to about 603 | 87 |
| ranges from about 696 to about 704 | 90 |

An exemplary embodiment of the invention is suggested in the drawings. As illustrated in FIGS. 2–3, the design, construction and operation of this exemplary filter 10 includes an adapter ring 12 or other means for securing the filter 10 to an eye viewing apparatus, such as a surveillance equipment, conventional eye wear or navigational equipment. The adapter ring 12 may include a variety of different shapes and sizes depending on the type of eye viewing apparatus. Preferably, the adapter ring 12 is circular in shape. It also has an outer diameter 14, inner diameter 16, and curved edge 18 having a width or axial length 20. In one embodiment, the outer diameter 14, inner diameter 16, curved edge radius 18 and width 20 equal in value 1.9, 1.6, 0.0750 and 0.8750 inches, respectively.

In further accordance with the invention, a filter element 22 is mounted in the adapter ring 12. The filter element 22 provides a long service life without deterioration or material change in optical properties. To this end, the filter element 22 can be made of a variety of optical materials, such as a high quality optical glass, high quality optical plastic or other similar optical material having substantially constant light-filtering properties throughout. When the filter element 22 is made so as to have the spectral response curve shown in FIG. 1, the filter element 22 has an orange color.

The filter element 22 can be attached to the adapter ring 12 in a variety of different ways. For example, the filter element 22 can be inset a distance 24 from the curved edge 18 of the adapter ring 12. In the illustrated embodiment, the distance 24 equals 0.2500 inches. The filter element 22 also has a thickness 26 and a center diameter 28. In the illustrated embodiment, these distances are 0.6250 and 1.6880 inches, respectively.

The design of the filter 10 for use with an eye viewing apparatus may take on many different variations depending on the type of the eye viewing apparatus. For example, the filter 10 can be attached in front or behind the eye viewing apparatus. The attachment mechanism is similar to the front-of-the-lens and behind-the-lens device disclosed in U.S. Pat. No. 4,542,959 and is incorporated herein by reference.

In an embodiment, the filter 10 is attached to surveillance equipment typically used by law enforcement agencies. The present invention is not limited by the type of surveillance equipment or how the filter is attached to the surveillance equipment.

In an embodiment, the filter 10 is attached to conventional eye wear. The conventional eye wear may include sun glasses, ski glasses, eye glasses or other similar devices through which the human eye sees. An exemplar embodiment includes eye wear that has a close-fitting frame in order to block out peripheral unfiltered light.

The following is claimed as the invention:

1. A color enhancing optical filter for improving eye vision under lighting environments, comprising, in combination, mounting means for mounting the filter to an eye viewing apparatus that is placed in an air medium subject to extreme lighting conditions comprising a brightly illuminated light level or a low level light and which results from environmental conditions comprising rain, fog, snow, haze, or sun glare and a filter element secured to the mounting means and passing impinging light wavelengths as follows:

| Light Wavelength (nm) | % Incident Light Transmitted |
|---|---|
| ranges from about 396 to about 404 | 25 |
| ranges from about 445 to about 455 | 12 |
| ranges from about 465 to about 475 | 08 |
| ranges from about 495 to about 505 | 04 |
| ranges from about 515 to about 525 | 07 |
| ranges from about 564 to about 576 | 50 |
| ranges from about 594 to about 606 | 87 |
| ranges from about 693 to about 707 | 90. |

2. A color enhancing filter according to claim 1 further comprising said passing impinging light wavelengths as follows:

| Light Wavelength (nm) | % Incident Light Transmitted |
| --- | --- |
| 400 | 25 |
| 450 | 12 |
| 470 | 08 |
| 500 | 04 |
| 520 | 07 |
| 570 | 50 |
| 600 | 87 |
| 700 | 90. |

3. A color enhancing filter according to claim 1 wherein said filter element comprises optical glass having substantially constant light-filtering properties throughout.

4. A color enhancing filter according to claim 1 wherein said filter element comprises optical plastic having substantially constant light-filtering properties throughout.

5. A color enhancing filter according to claim 1 wherein the mounting means is adapted for connection to the front of the eye viewing apparatus.

6. A color enhancing filter according to claim 1 wherein the mounting means is adapted for connection to the rear of an eye viewing apparatus.

7. A method of improving human vision under lighting conditions employing a color enhancing optical filter comprising the steps of securing the filter to an eye viewing apparatus, placing the eye viewing apparatus along with the filter in an air medium subject to extreme lighting conditions comprising a brightly illuminated light level or a low level light and that results from environmental conditions comprising rain, fog, snow, haze, or sun glare, causing light to travel through the medium, and from the subject through the air medium and through the filter and eye viewing apparatus, filtering the light wavelengths passing through the filter as follows:

| Light Wavelength (nm) | % Incident Light Transmitted |
| --- | --- |
| ranges from about 396 to about 404 | 25 |
| ranges from about 445 to about 455 | 12 |
| ranges from about 465 to about 475 | 08 |
| ranges from about 495 to about 505 | 04 |
| ranges from about 515 to about 525 | 07 |
| ranges from about 564 to about 576 | 50 |
| ranges from about 594 to about 606 | 87 |
| ranges from about 693 to about 707 | 90. |

8. A method of improving human eye vision according to claim 7 further comprising the step of filtering the light wavelengths passing through the filter as follows:

| Light Wavelength (nm) | % Incident Light Transmitted |
| --- | --- |
| 400 | 25 |
| 450 | 12 |
| 470 | 08 |
| 500 | 04 |
| 520 | 07 |
| 570 | 50 |
| 600 | 87 |
| 700 | 90. |

9. A method of improving human eye vision according to claim 8 wherein the eye viewing apparatus comprises surveillance equipment.

10. A method of improving human eye vision according to claim 8 wherein the eye viewing apparatus comprises conventional eye wear.

* * * * *